(12) United States Patent
Shah et al.

(10) Patent No.: US 6,310,910 B1
(45) Date of Patent: Oct. 30, 2001

(54) HIGH SPEED PARALLEL BURST MODEM

(75) Inventors: Biren Shah, Redmond; Sami Hinedi, Bellevue, both of WA (US)

(73) Assignee: Teledesic LLC, Kirkland, WA (US)

( * ) Notice: Subject to any disclaimer, the term of this patent is extended or adjusted under 35 U.S.C. 154(b) by 0 days.

(21) Appl. No.: 09/099,082

(22) Filed: Jun. 17, 1998

(51) Int. Cl.$^7$ ...................................................... H04B 1/38
(52) U.S. Cl. .............................................................. 375/222
(58) Field of Search ..................................... 375/222, 152

(56) References Cited

U.S. PATENT DOCUMENTS

| | | | |
|---|---|---|---|
| 4,661,951 | * 4/1987 | Segarra .................................. | 375/152 |
| 5,956,369 | * 9/1999 | Davidovici et al. ................... | 370/475 |
| 6,061,406 | * 5/2000 | Carson et al. ......................... | 375/260 |

OTHER PUBLICATIONS

Sadr et al., "Design of Wideband All–Digital Phase Locked Loops Using Multirate Digital Filter Banks," *IEEE Transactions on Communications*, vol. 44, No. 6, Jun. 1996.

Sadr et al., "Parallel Digital Modem Using Multirate Digital Filter Banks," Jet Propulsion Laboratory, California Institute of Technology, JPL Publication 94–20, Aug. 15, 1994.

Sadr et al., "Wideband Modem Design Based on Multirate Filter Banks," 1995 IEEE International Conference on Communications, Jun. 18–22, 1995, vol. 2, pp. 889–893., 1995.

* cited by examiner

*Primary Examiner*—Chi Pham
*Assistant Examiner*—Kevin M Burd
(74) *Attorney, Agent, or Firm*—Christensen O'Connor Johnson Kindness PLLC

(57) ABSTRACT

A modem includes a high speed parallel processing transmitter, receiver and decoder. Each of the transmitting and receiving portions of the modem include a plurality of parallel processing channels that process data in a sub-band. Each of the processing channels can operate at a rate which is less than the overall rate at which data is processed. In each channel is a unique word sub-band filter and a data sub-band filter that are selectively enabled to filter data in the channel. The unique word filters in the transmitting portion of the modem are specifically tuned to make the unique word that precedes the data portion of a data burst easy to detect. In the receiving portion of the modem, the unique word sub-band filters are tuned to quickly detect the unique word. Once a unique word has been received, the data sub-band filters in the receiving portion of the modem are enabled in each of the channels to filter the data portion of a burst.

4 Claims, 5 Drawing Sheets

HIGH SPEED PARALLEL BURST MODEM

FIELD OF THE INVENTION

The present invention relates to communication systems in general and to high speed digital satellite data communications systems in particular.

BACKGROUND OF THE INVENTION

In recent years the need for global data networking capability has rapidly expanded. In order to meet this need, broadband satellite communication systems have been proposed as an alternative to land-based communication systems. One type of satellite data communication system is described in a number of U.S. patents assigned to Teledesic LLC of Kirkland, Washington, the assignee of this patent application. These patents include U.S. Pat. Nos. 5,386,953; 5,408,237; 5,527,001, 5,548,294; 5,641,135; 5,642,122, and 5,650,788 and other pending applications which describe a satellite communication system that employs a constellation of low-Earth orbit (LEO) satellites and an Earth-fixed cell transmission scheme. Data to be sent from one location on the Earth to another location is transmitted from a ground terminal located within a cell to a satellite that is serving the cell via an uplink data channel. The data is routed through the constellation of LEO satellites to a satellite that is servicing the cell within which the designated ground terminal is located. The latter satellite transmits the data to the ground terminal via a downlink data channel. Thus, the constellation of LEO satellites and the ground terminals form a data communication network wherein each ground terminal and satellite forms a node of the network.

For a LEO satellite data communication system to be competitive with conventional ground-based data communication systems, it must support broadband applications at a relatively low cost. In order to allow the transmission of real time video, full duplex telecommunications, and other bandwidth intensive applications, it is estimated that the data transmission rate for a LEO satellite data communication system must approach 400 Megasymbols/second. This data rate is an order of magnitude above any data rate currently used in satellite communication systems.

Designing an inexpensive receiver for use as a ground terminal or satellite that can receive information at such a high data rate has proven to be problematic. The traditional approach to creating a high data rate receiver has been to buffer the received data and process the data after reception (i.e., not in real-time). An example of such a buffered receiver is shown in FIG. 1. Data received from a satellite on the downlink or from a ground terminal on the uplink is applied to an analog to digital converter 10, where it is converted into a series of digital samples. Because the samples arrive at a rate that is faster than the rate at which they can be processed, the samples are stored in a buffer 12 and decoded by a demodulator 14 at the rate at which the demodulator is able to operate. Processing the data after reception is not a satisfactory solution in a LEO satellite data communication system for several reasons. Most importantly, the size of the buffers necessary to store the received data would greatly increase the cost of the ground terminals and satellites. Buffering also places strict limits on scheduling of data transmissions between nodes in the network to ensure that the buffers at a particular node do not overflow. The additional overhead necessary to avoid buffer overflow adds to the complexity of managing the communication system. Moreover, the overall throughput of the satellite communication system may be diminished due to a bottleneck at any one of the satellites or ground terminals.

An alternative approach to creating a high data rate receiver is to distribute the data processing tasks of a receiver among multiple channels that are connected in parallel. By processing the data in parallel channel, the overall data processing rate of any particular channel is sufficiently reduced to allow the data to be processed in realtime, i.e., as the data is received. A parallel digital modem architecture for use in deep space communications has been suggested in a Jet Propulsion Laboratory report entitled "Parallel Digital Modem Using Multirate Digital Filter Banks," published Aug. 15, 1994, and co-authored by one of the inventors of the present application. This article is herein incorporated by reference.

Although such parallel processing works well when a continuous data stream is received by a receiver, it has not been possible to implement a parallel receiver in a LEO satellite data communication system due to the manner in which data is transmitted between the satellites and the ground terminals. Traditional deep space satellite communication systems transmit data more-or-less continuously, allowing sufficient time for a ground terminal receiver to synchronize with the incoming data transmission. In contrast, the proposed LEO systems have adopted discontinuous interlink and downlink transmission schemes. That is, data is transmitted between satellites or from a servicing satellite to a ground terminal in a burst that may start at any time and be of variable duration. Because a receiver does not know when a data burst will be received or the length of the burst, prior art parallel receivers have been unable to quickly synchronize with the received data stream. The inability to quickly synchronize with the received data stream has prevented parallel transmitters and receivers from being considered as a viable alternative for high data rate transmitters and receivers in satellite data communication systems.

Given the shortcomings in the prior art, there is a need for a relatively low-cost data transmitter and receiver that can accommodate high transmission rates of bursty data having random durations.

SUMMARY OF THE INVENTION

To increase the rate at which data can be processed in a low-Earth orbit satellite system, the present invention comprises a high speed parallel processing modem that is adapted to transmit and receive high speed bursty data of unknown duration. Each of the transmitter, receiver and decoder divides data processing among a plurality of channels that operate in a frequency sub-band. Each channel operates at a lower rate than the rate at which the combined data from all the channels is processed.

To allow a bursty data signal to be quickly detected, the transmitting and receiving portions of the modem include a plurality of sub-band data filters and sub-band unique word filters that are selectively enabled in each of the channels. The sub-band unique word filters are designed to shape transmission of a unique word that precedes the data in the transmitter and to detect the presence of the unique word in the receiver. In the transmitter, once the unique word is transmitted, the sub-band unique word filters are disabled and the sub-band data filters are enabled in the channels to shape the transmission of data. The sub-band data filters remain in the channels until the next unique word is to be transmitted. In the receiving portion of the modem, once the unique word is detected, the data sub-band filters are enabled in each of the channels to filter the received data stream. The sub-band data filters remain until a central processing unit determines that the number of errors in the detected data stream exceeds a predetermined maximum. At this time, the unique word sub-band filters are re-enabled in each of the channels to detect the next transmission of a unique word.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
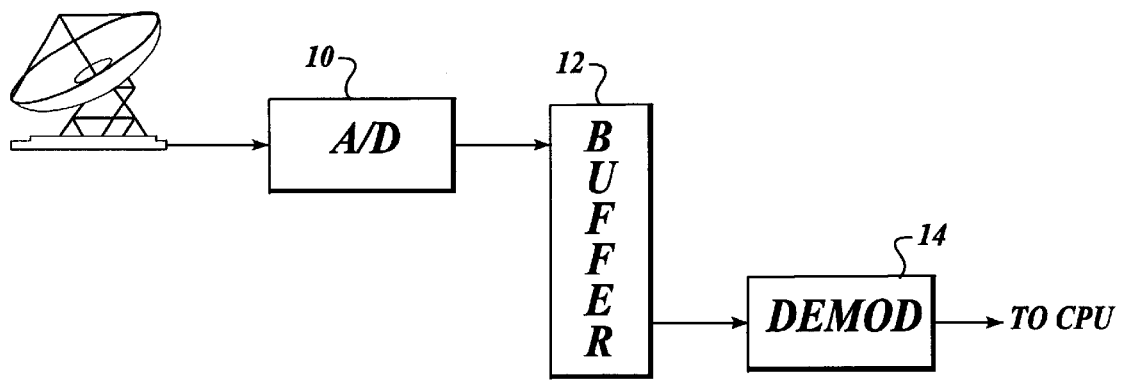
FIG. 1 is a simplified block diagram of a prior art buffered receiver.
Figures 2, 3:
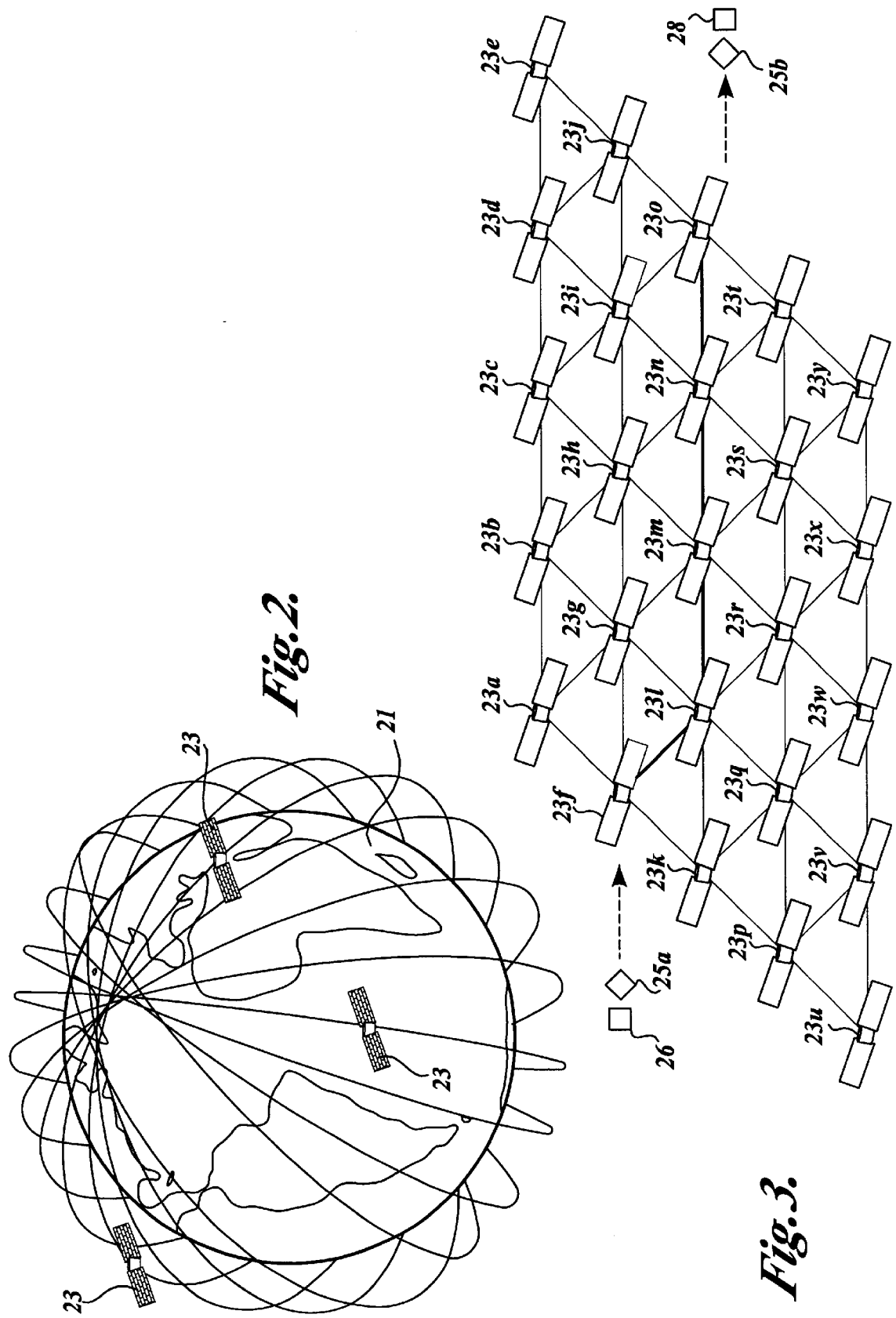
FIG. 2 is a pictorial diagram showing the orbital paths of a constellation of low-Earth orbit (LEO) satellites positioned to cover the entire surface of the Earth.
FIG. 3 is a plan view of a portion of the constellation of LEO satellites depicted in FIG. 2.

The present invention is directed to a high speed parallel processing modem for use in a low-Earth orbit (LEO) satellite communication network. A LEO satellite communication network includes a constellation of satellites orbiting the Earth such that a majority of the Earth is within the view of at least one satellite at any point in time. One proposed LEO satellite communication network employs 288 satellites, plus spares, located in 12 polar orbit planes. Each plane includes 24 satellites at an altitude of approximately 1,350 kilometers. The path of travel of the satellites of such a network is generally depicted in FIG. 2. More specifically, FIG. 2 depicts the Earth 21 surrounded by a plurality of rings that depict the orbital planes of a plurality of satellites 23.

FIG. 3 illustrates a number of the satellites 23a, 23b, 23c . . . that make up the constellation of satellites included in an LEO satellite communication network of the type illustrated in FIG. 2. The satellites are shown closer to one another for illustrative purposes only. As shown in FIG. 3, a data signal 25a, consisting of one or more data packets, is transmitted on an uplink data communication channel by a ground terminal 26 and received by a first satellite 23f that forms part of the constellation of satellites. The data packets are routed through the constellation of satellites. The routing path selected is dependent on network traffic. For example, the receiving or uplink satellite may forward the one or more data packets to a second satellite 23l, which in turn forwards the data packets to a third satellite 23m, which forwards the data packets to a fourth satellite 23n. The routing continues until the data packets reach the satellite 23o associated with the ground terminal 28 that is to receive the data packets. This satellite, called the sending or downlink satellite, transmits the data packets as a data signal 25b to the receiving ground terminal 28. The receiving ground terminal forwards the data to an end user. It is to be understood that the data packets of a message may be routed through different paths in the constellation of satellites and may arrive at the ground terminal in a different order than they were sent. In this case, upon receipt at the ground terminal, the data packets are re-ordered in the correct order before the data is forwarded to the end user.

The satellites 23 are equipped with a steerable downlink antenna having a plurality of beams that can be directed at any of the cells in the satellite's footprint.

The direction in which a beam is pointed and the duration for which a beam is maintained in a particular direction are dictated by the data traffic to be transmitted and therefore cannot be known in advance. Therefore, the receivers in the ground terminals must be able to quickly decode all the data transmitted on the downlink because the downlink beam may be quickly redirected to another cell in the footprint.

Figure 4:
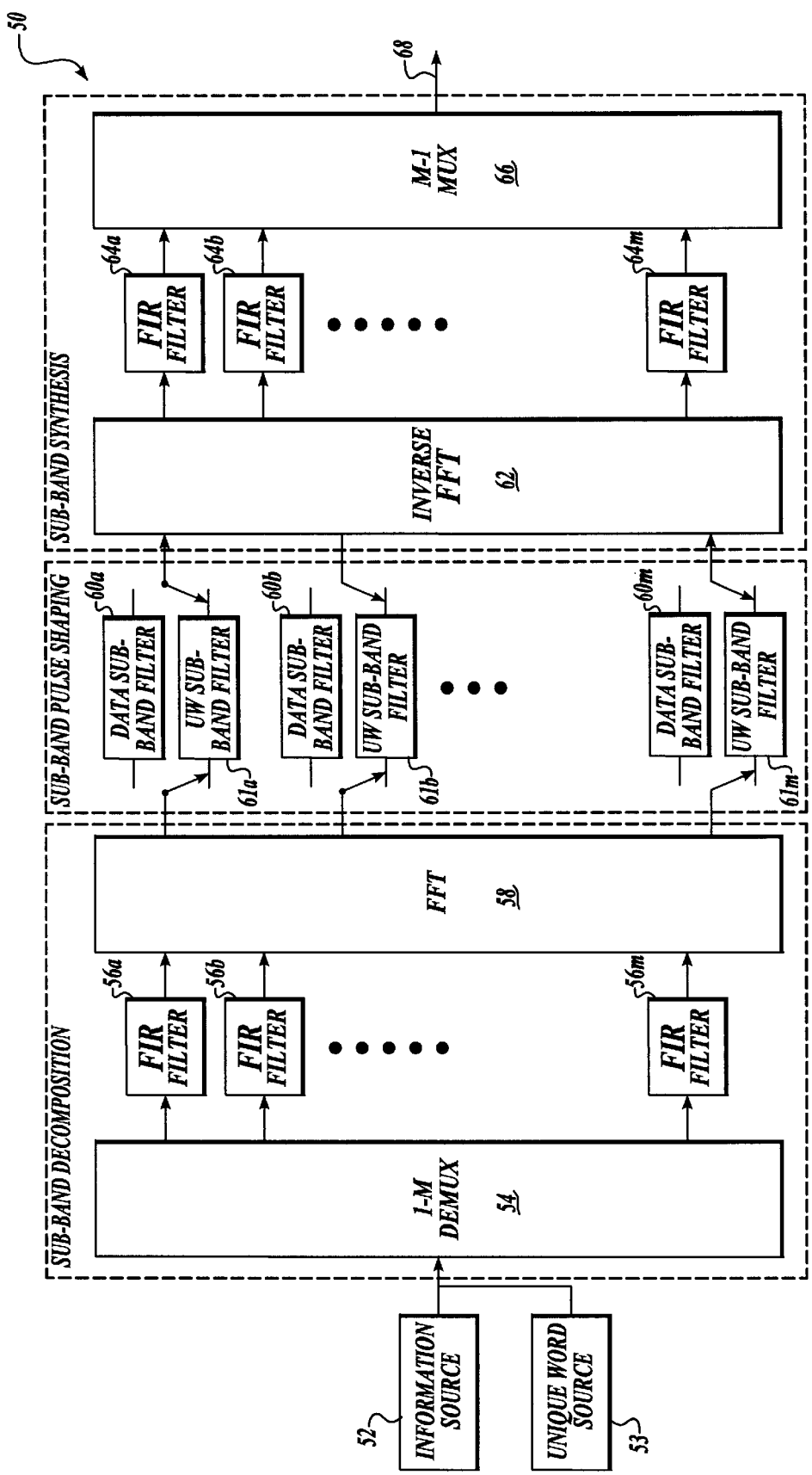
FIG. 4 is a block diagram of a high speed parallel processing transmitting portion of a modem according to the present invention.

As indicated above, the ability of the LEO satellite system to transmit data from one ground terminal to another is largely dependent upon the rate at which data can be transmitted and received between the satellite and the ground terminals. At the data rates required for high bandwidth applications, this speed is often limited by the rate at which data can be processed by the transmitters and receivers in the ground terminals and satellites. While parallel processing architectures have been utilized for continuous data transmission systems, they have not previously been adaptable to high speed asynchronous data transmission systems due to the difficulty of synchronizing a receiver with a high speed data burst. To increase the throughput of a satellite communication system, the present invention comprises a high speed parallel processing modem that facilitates the detection of a high speed data burst that is transmitted between a ground terminal and a satellite or between two satellites FIG. 4 is a block diagram of a high speed parallel processing transmitting portion of a modem according to one aspect of the present invention. The transmitting portion of the modem 50 receives a stream of binary data from an information source 52 which may be a ground terminal or another satellite, and supplies the data stream to a series of components that divide the data stream into one of a number of channels, each of which processes a portion of the data stream that lies within a fraction of the spectrum occupied by the entire incoming data stream. This sub-band decomposer includes a 1-m demultiplexer 54 that operates to sequentially supply a sample of the incoming data stream to a parallel bank of FIR filters 56a, 56b . . . 56m. The demultiplexer 54 is operated as a commutator such that the first sample is supplied to the FIR filter 56a. The next sample is supplied to the second FIR filter 56b and so on. The outputs of the m-FIR filters 56 feed a fast Fourier transform (FFT) block 58 that performs the well known FFT operation. Together the FIR filters 56a–56m and the FFT block 58 implement a uniform filter bank such that the $i^{th}$ output of the FFT block 58 corresponds to the output of the $i^{th}$ filter in the filter bank 56. For example, the combination of the FIR filter 56a and the topmost output of the FFT block 58 operates to convert the input data stream into a corresponding sequence of data having frequency components that are centered around DC. Because the channels only receive every $M^{th}$ incoming data sample, they can be implemented with reduced speed electronics.

The design of the FIR filters 56a–56m and the FFT block 58 is defined by the equations 27–30, and is shown in FIG. 4 of the JPL article discussed above.

Each of the m channels of the transmitting portion of the modem further includes a data sub-band filter 60a, 60b . . .

60m. The data sub-band filters operate to condition the data that is processed by the channel such that the bandwidth of the transmitted signal produced by all the channels of the modem is minimized. The design of the data sub-band filters 60a–60m is defined in Section IV and FIGS. 30–37 of the JPL article discussed above.

Connected in parallel with each of the data sub-band filters 60a–60m is a set of unique word sub-band filters 61a–61m. In order to allow a receiver to quickly synchronize to a transmitted data burst, the transmitter portion of the modem precedes the data with a unique word that comprises a defined sequence of bits. The unique word is received from a unique word source 53 that is connected to the 1-m demultiplexer 54 prior to the transmission of data. When the unique word source 53 is connected to the demultiplexer 54, the data sub-band filters are disabled or switched out of each channel and replaced with a unique word sub-band filter. The purpose of the unique word sub-band filters 61a–61m is to condition the transmission of the unique word so that it has a transmission characteristic or "signature" that is readily distinguished from the transmission characteristic of the data transmitted by the modem. Again, the unique word filters 61a–61m may be designed as set forth in Section IV and FIGS. 30–37 of the JPL article. However, the transmission characteristics of the unique word sub-band filters should be selected to differ from those of the data sub-band filters. For example, the unique word sub-band filters 61a–61m are preferably designed so that the spectrum of the transmitted unique word corresponds to a sequence not normally seen during data transmission in order to allow a receiver to quickly detect the reception of the unique word that precedes the data, and a pulse shape that enables the receiver to quickly synchronize to it.

The output of each of the data and unique word sub-band filters 60a–60m, 61a–61m is supplied to a sub-band synthesizer that comprises an inverse fast Fourier transform block 62, a parallel bank of m-FIR filters 64a–64m and an m-to-1 multiplexer 66. The inverse fast Fourier transform block 62 receives the data from each of the m data sub-band filters 60a–60m or unique word sub-band filters 61a–61m and creates, in combination with a corresponding FIR filter 64, a corresponding set of full bandwidth data or unique word. The design of the inverse fast Fourier transform block 62 and the FIR filters 64a–64m is described by the Equations 27–30 and shown in FIG. 17 of the JPL article.

To combine outputs from each of the channels, the outputs of the FIR filters 64a–64m are supplied to the m-to-1 multiplexer 66 that produces the data or unique word to be transmitted on a single line 68.

By dividing the processing tasks in the transmitting portion of the modem 50 among the m channels, data can be transmitted at a rate which is faster than the operating speed of the individual components that comprise the transmitting portion of the modem.

Figure 5:
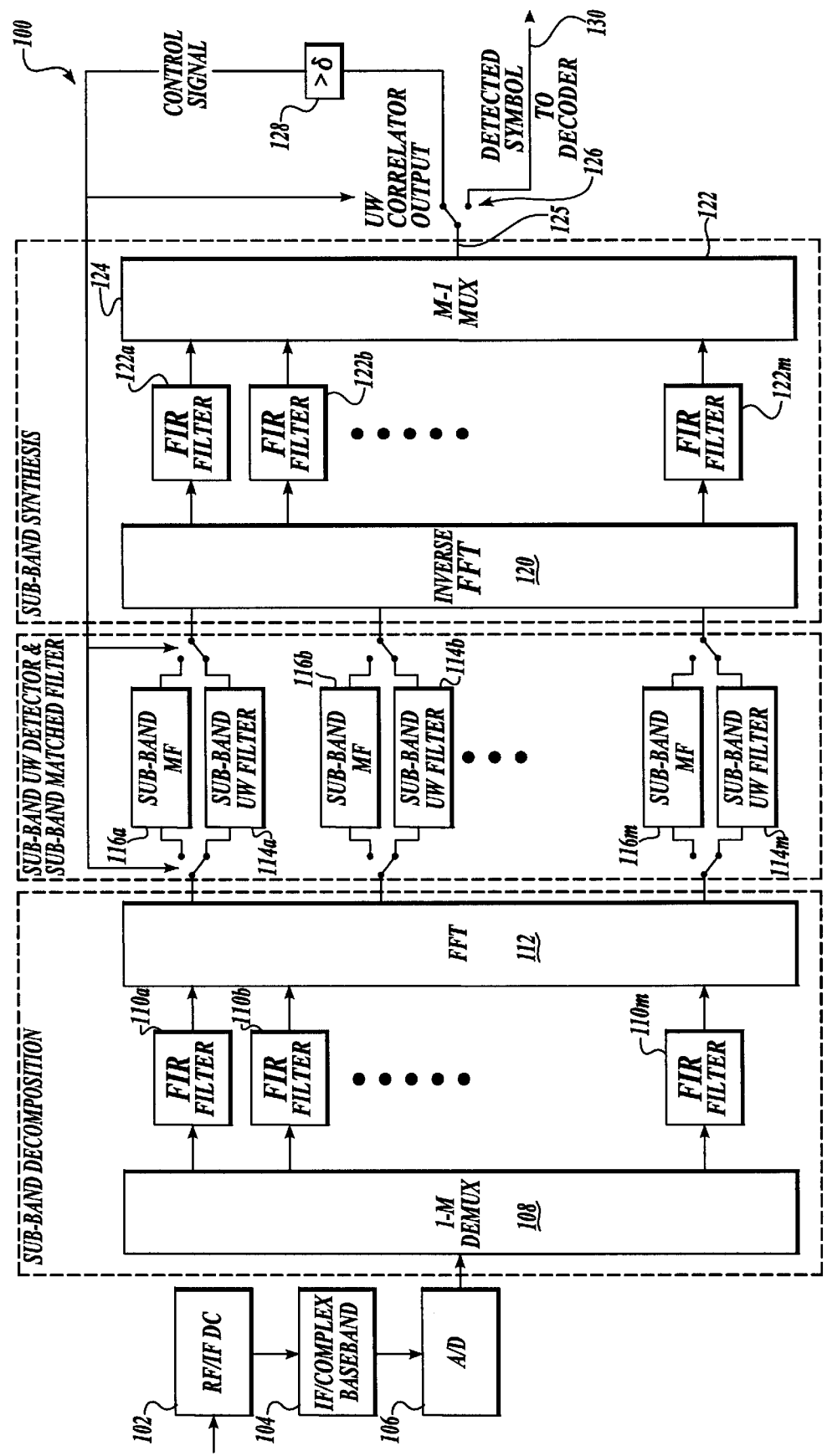
FIG. 5 is a block diagram of a high speed parallel processing receiving portion of a modem according to the present invention.

A block diagram of a high speed parallel receiving portion 100 of a modem according to the present invention is shown in FIG. 5. As with the transmitting portion, the receiving portion is divided into m parallel processing channels, each of which operates at a rate that is slower than the overall rate at which data is received by the modem.

High speed, asynchronous data received from a ground terminal or a satellite is supplied to an RF down converter 102 that shifts the frequency of the receive signal to an intermediate frequency (IF) that is more readily processed by the modem. The intermediate frequency signal is applied to an IF to complex baseband down convertor 104 that converts the incoming signal to a baseband signal having an in-phase I, and quadrature component Q. Each of the I and Q components are supplied to an analog to digital converter 106 that creates a series of digital samples representing the received I and Q signals. Each sample produced by the analog to digital converter 106 is input to a sub-band decomposing circuit that includes a 1-to-m demultiplexer 108, that routes each sample of the analog to digital converter 106 into one of the m channels. Each channel includes one of m-FIR filters 110a–110m and a fast Fourier transform block 112. These components operate to create a set of digital data that represents the incoming samples having frequency components that lie within a set of sub-bands in the same manner as the sub-band decomposing circuitry described in connection with the transmitting portion of the modem shown in FIG. 4.

The outputs of the fast Fourier transform block 112 feed a bank of m sub-band data filters 116a–116m and m sub-band unique word filters 114a–114m that are selectively enabled or switched into the channel depending on whether the unique word or the data portion of a burst is being detected.

As indicated above, because the data burst transmitted from a satellite to a ground terminal is unpredictable in its start time and duration, it is important that the burst be accurately decoded on the first attempt. To accurately synchronize the receiver to the burst data stream, the unique word that precedes a data packet comprises a known pattern of bits that marks the beginning of a data portion of the data packet. Because the receiving portion of the modem does not know the time at which a data burst will be transmitted from the satellite, the modem continually decodes signals received by the downconverter 102. The signals are continually compared to the predetermined series of bits that comprise the unique word to determine when data is being transmitted. The output of the m unique word sub-band filters 114a–114m is minimal until the unique word is transmitted. Once the structure or bit pattern of the unique word is known, the unique word filters can be designed to detect the unique word according to the techniques described in Section IV.1 and FIGS. 30–37 of the JPL article.

Once the receiving portion of the modem detects the unique word, the unique word filters are disabled or switched out of the channels and the data sub-band filters 116a–116m are enabled or switched into the channels. The data sub-band filters 116a–116m perform matched filter detection on the received data and are designed as described in section IV.1, FIGS. 30–37 of the JPL article.

The outputs of the unique word sub-band filters 114a–114m or the data sub-band filters 116a–116m are applied to a sub-band synthesizer that includes an inverse fast Fourier transform (FFT) block 120, a parallel bank of m-FIR filters 122a–122m and an m-to-1 multiplexer 124. The inverse fast Fourier transform block 120 operates in conjunction with the corresponding FIR filters 122a–112m to create data that represents a full spectrum filtered I or Q signal representing the data or unique word.

The outputs of the FIR filters 122a–112m are fed to the m-to-1 multiplexer 124 that combines the outputs of the FIR filters into a single output 125.

The output 125 is coupled through a switch 126 having two positions. In the first position, the data stream produced by the multiplexer 124 is routed to a comparator 128 that compares the data stream against a predetermined threshold, δ. Once the data stream exceeds a predetermined threshold, δ, the comparator 128 changes the position of the switch 126 so that data produced on the output 125 is directed to an output 130 which is coupled to a symbol decoder described below. In addition, the comparator 128 provides a control signal which causes the bank of unique word sub-band filters 114a–114m to be switched out of the channels and the data sub-band filters 116a–116m to be switched into the channels so that the data produced by the fast Fourier transform block 112 is passed through the bank of data sub-band filters 116a, 116b . . . 116m.

Figure 6:
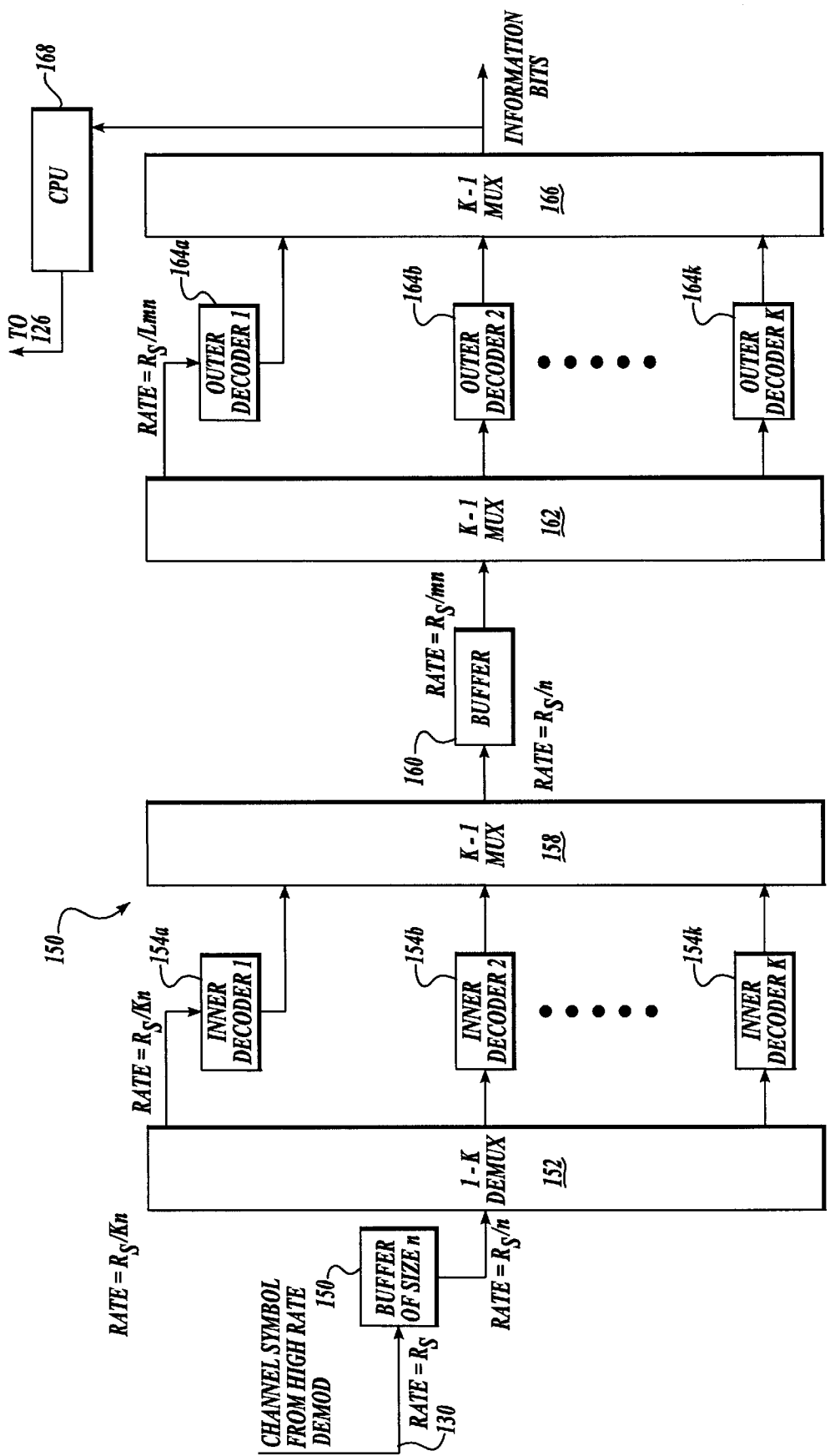
FIG. 6 is block diagram of a high speed parallel processing decoding portion of a modem according to the present invention.

FIG. 6 is a block diagram of a decoding portion 150 of a modem according to the present invention that is coupled to receive the data supplied on the output 130 from the receiving portion of the modem shown in FIG. 5. The received data is accumulated in a buffer 150 that stores n data bits. Data bits from the buffer 150 are supplied to a 1-to-k demultiplexer 152 when the buffer is filled. The demultiplexer 152 routes the data bits to one of k inner decoders 154a, 154b . . . 154k. The inner decoders 154a–154k strip an inner correction code from the data contained in the buffer 150. The outputs of the inner decoders 154a–154k are supplied to a k-to-1 multiplexer 158 that concatenates the decoded data back into a single data stream. The data stream is accumulated in a buffer 160 that stores m bits.

The data bits stored in the buffer 160 are applied to a 1-to-k demultiplexer 162 that routes blocks of m bits stored in the buffer 160 to one of a series of k outer decoders 164a, 164b . . . 164k. The outer decoders 164a–164k operate to remove an outer error correction code from the data stored in the buffer 160. The outputs of each of the outer decoders 164a–164k are supplied to a k-to-1 multiplexer 166 that concatenates the data back into a serial data stream.

As indicated above, the receiving portion of the modem shown in FIG. 5 continues to decode all signals received by the down converter 102. To determine when a data burst has been fully received, a central processing unit 168 monitors the output of the multiplexer 166 to determine when the errors in the received data exceed a predetermined threshold. At such time, it is assumed that the data burst has ended and that the decoder is simply decoding the background noise. At this time, the central processing unit 168 changes the position of switch 126 (FIG. 5) such that the output of the multiplexer 122 is applied to the comparator 128 and creates a control signal which causes the unique word sub-band filters 114a–114m to be re-inserted into the channels of the receiving portion of the modem. These unique word sub-band filters remain in the channels until the unique word is again detected and the data sub-band filters 116a–116m can be connected.

As can be seen by the above description, the present invention comprises a high speed modem that is able to transmit and detect high speed bursty data. The modem does not require the use of large buffers or require that data be processed off line. In addition, the modem can be made inexpensively because the individual components need not operate at the full speed at which data is transmitted or received. As such, the data transmitted by the LEO satellite system is not limited by the speed of the modems in the satellites.

The embodiments of the invention in which an exclusive property or privilege is claimed are defined as follows:

1. A modem for receiving a high frequency asynchronous data burst that is preceded by a unique word, the modem including a receiver that comprises:

a down converter that shifts the frequency of a received asynchronous data burst;

an analog to digital converter that samples the frequency shifted data burst;

a demultiplexer that sequentially applies the samples to one of a plurality of channels each of which processes a portion of the asynchronous data burst in a frequency sub-band, each of the channels including:

a filter and fast Fourier transformer that converts data received from the demultiplexer into data that has frequency components within one of the sub-bands;

a unique word sub-band filter and a data sub-band filter that are selectively enabled in the channel to filter the data in the sub-band, wherein the unique word sub-band filter is matched to the unique word that precedes the data burst;

an inverse fast Fourier transformer and filter that convert the filtered sub-band data to full spectrum filtered data a multiplexer that combines the data from the inverse fast Fourier transformer and filters of the plurality of channels to produce a filtered data burst; and a comparator that correlates the filtered data burst with the unique word, the comparator enabling the data sub-band filters in the channels when the filtered data burst correlates to the unique word.

2. The modem of claim 1, wherein the asynchronous data burst includes error correction codes, the receiver further comprising:

a processor that monitors a number of errors in the filtered data burst produced from the multiplexer and causes the unique word sub-band filters to be enabled in each processing channel when the number of errors exceeds a predetermined threshold.

3. The modem of claim 1, further comprising:

a transmitter that transmits an incoming data stream, the transmitter including:

a demultiplexer that divides the incoming data stream among a plurality of channels that process a portion of the data stream within a frequency sub-band, each channel having a data sub-band filter and a unique word sub-band filter that are selectively enabled in the channel, the unique word sub-band filters being enabled in the channel when a unique word that precedes a data burst is transmitted.

4. The modem of claim 3, wherein the unique word sub-band filters shape the transmission characteristics of the unique word to distinguish the unique word from a data portion of the burst when received.

* * * * *